United States Patent [19]

Foy et al.

[11] 4,332,920
[45] * Jun. 1, 1982

[54] MOULDABLE AND EXTRUDABLE POLYETHER-ESTER-AMIDE BLOCK COPOLYMERS

[75] Inventors: Paul Foy, Paris; Camille Jungblut; Gérard Deleens, both of Orsay, all of France

[73] Assignee: ATO Chimie, Courbevoie, France

[*] Notice: The portion of the term of this patent subsequent to Oct. 28, 1997, has been disclaimed.

[21] Appl. No.: 150,288

[22] Filed: May 16, 1980

Related U.S. Application Data

[63] Continuation of Ser. No. 948,297, Oct. 3, 1978, Pat. No. 4,230,838, which is a continuation of Ser. No. 784,723, Apr. 5, 1977, abandoned, which is a continuation of Ser. No. 582,428, May 30, 1975, abandoned.

[30] Foreign Application Priority Data

May 31, 1974 [FR] France .................. 74 18913

[51] Int. Cl.$^3$ ............................................ C08L 77/00
[52] U.S. Cl. ................................ 525/408; 525/411; 525/419; 525/430
[58] Field of Search ............... 525/408, 411, 419, 430

[56] References Cited

U.S. PATENT DOCUMENTS

| | | | |
|---|---|---|---|
| 3,265,762 | 8/1966 | Quisenberry | 260/860 |
| 3,549,724 | 12/1970 | Okazaki | 260/857 PG |
| 3,636,135 | 1/1972 | Garforth | 260/857 PG |
| 3,660,356 | 5/1972 | Radlmann | 260/75 N |
| 3,766,146 | 10/1973 | Witsiepe | 260/75 R |
| 3,839,245 | 10/1974 | Schlossman | 260/18 N |
| 3,862,262 | 1/1975 | Hendrick | 260/857 PG |
| 4,105,640 | 8/1978 | Fortuna et al. | 528/292 |
| 4,230,838 | 10/1980 | Foy et al. | 525/408 |

*Primary Examiner*—Carman J. Seccuro
*Attorney, Agent, or Firm*—Bacon & Thomas

[57] ABSTRACT

The invention relates to a method of preparing polyether-ester-amide block copolymers having recurrent units of the general formula:

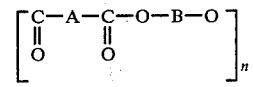

wherein A is a polyamide sequence and B a linear or branched polyoxyalkylene glycol sequence, the alkylene radical of which comprises at least two carbon atoms, and wherein n indicates that there is a great number of recurrent units. The plastic materials prepared by the novel method have mechanical properties which allow them to be used in technological transformation operations for the manufacture or moulded or extruded articles such as films, sheaths, fibres for textiles products, etc.. They may also be used for making bonded or welded linings. The novel method comprises reacting in the fused state at an elevated temperature and under high vacuum a dicarboxylic polyamide, the COOH groups of which are located at the chain ends, with a polyoxyalkylene glycol hydroxylated at the chain ends, in the presence of a catalyst constituted by a tetraalkylorthotitanate having the general formula Ti(OR)$_4$, wherein R is a linear or branched aliphatic hydrocarbon radical having 1 to 24 carbon atoms, such a methyl, isopropyl, butyl, ethylhexyl, dodecyl, hexadodecyl.

34 Claims, No Drawings

MOULDABLE AND EXTRUDABLE POLYETHER-ESTER-AMIDE BLOCK COPOLYMERS

This is a continuation of application Ser. No. 948,297 filed Oct. 3, 1978, now U.S. Pat. No. 4,230,838, which in turn is a continuation of application Ser. No. 784,723, filed Apr. 5, 1977, now abandoned which is in turn a continuation of application Ser. No. 582,428, filed May 30, 1975, now abandoned.

The instant invention relates to a method of preparing mouldable and/or extrudable polyether-ester-amide block copolymers having recurrent units of the general formula:

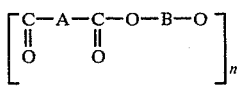

wherein A is a polyamide sequence and B a linear or branched polyoxyalkylene glycol sequence, the alkylene radical of which comprises at least two carbon atoms, and wherein n indicates that there is a great number of recurrent units.

Polymers of this type have already been prepared by synthesis and used as anti-static additives in the field of spinning and weaving polyamide or polyester fibres with a view to avoid the building-up of electric charges. The French Pat. Nos. 1,444,437 and 2,178,205 disclose methods which comprise reacting a dicarboxylic polyamide with a polyoxyalkylene glycol for obtaining block polycondensates used as anti-static agents; however, the products obtained by these known methods do not exhibit sufficiently satisfactory properties which will permit them to be used alone in moulding or extruding operations and, are therefore only used as additives.

The instant invention is aimed at overcoming these drawbacks, and the object of the invention is to provide a method of preparing polyether-ester-amide block copolymers having mechanical properties which allow these plastic materials to be used in technological transformation operations for the manufacture of moulded or extruded articles such as films, sheaths, fibres for textile products, etc.. These products may also be used for making bonded or welded linings.

The method of preparing polyether-ester-amide block copolymers in accordance with the instant invention comprises reacting in the fused state at an elevated temperature and under high vacuum a dicarboxylic polyamide, the COOH groups of which are located at the chain ends, with a polyoxyalkylene glycol hydroxylated at the chain ends, in the presence of a catalyst constituted by a tetraalkylorthotitanate having the general formula $Ti(OR)_4$, wherein R is a linear or branched aliphatic hydrocarbon radical having 1 to 24 carbon atoms, such a methyl, isopropyl, butyl, ethylhexyl, dodecyl, hexadodecyl.

The action of this catalyst brings along a great number of advantages as regards the polycondensation reaction as well as the properties of the product thus obtained.

At the beginning of the reaction two non-miscible phases are present, one of which is the polyamide phase which exhibits a comparatively low fluidity. In the absence of the above-mentioned catalyst the polycondensation reaction will be quite incomplete, the viscosity values will remain small and the product obtained will contain a great amount of polyoxyalkylene glycol which has not reacted, whereby the product obtained is rendered friable and unable to undergo the technological transformation operations such as moulding, calendering, extrusion, and the like.

When applying the method according to the invention, wherein the polycondensation reaction is effected in the fluid state in the presence of a tetraalkylorthotitanate, a product is obtained which has satisfactory mechanical properties and which, consequently, can be submitted to transformation processes such as moulding or extrusion with a view to manufacturing the desired finished products.

The catalyst may be used alone or in combination with an alkaline or alkaline-earth alcoholate in an amount of 0.01 to 5% by weight, preferably 0.05 to 2% by weight of the total amount of the reaction mixture constituted e.g. by $Ti(OR)_4 + RoNa$.

The polyamides having dicarboxylic chain ends are obtained by conventional methods currently used for preparing such polyamides, such methods comprising e.g. the polycondensation of a lactam or the polycondensation of an amino-acid or of a diacid and a diamine, these polycondensation reactions being carried out in the presence of an excess amount of an organic diacid the carboxylic groups of which are preferably located at the ends of the hydrocarbon chain; these carboxylic diacids are fixed during the polycondensation reaction so as to form constituents of the macro-molecular polyamide chain, and they are attached more particularly to the ends of this chain, which allows a α-ω-dicarboxylic polyamide to be obtained. Furthermore, this diacid acts as a chain limitator. For this reason, an excess amount of α-ω-dicarboxylic diacid is used with respect to the amount necessary for obtaining the dicarboxylic polyamide, and by conveniently selecting the magnitude of this excess amount the length of the macromolecular chain and consequently the average molecular weight of the polyamides may be controlled.

The polyamide can be obtained starting from lactams or amino-acids the hydrocarbon chain of which comprises from 4 to 14 carbon atoms, such as caprolactam, oenantholactam, dodecalactam, undecanolactam, dodecanolactam, 11-amino-undecanoic acid, or 12-aminododecanoic acid.

The polyamide may also be a product of the condensation of a dicarboxylic acid and a diamine such as nylon 6-6, 6-9, 6-10, 6-12 and 9-6, which are products of the condensation of hexamethylene diamine with adipic acid, azelaic acid, sebacic acid, 1,12-dodecanedioic acid, and of nonamethylene diamine with adipic acid.

The diacids used as chain limitators in the reaction of synthesis of the polyamide, which also allow polyamides having carboxyl chain ends, to be obtained, are carboxylic diacids, preferably aliphatic carboxylic diacids having 4 to 20 carbon atoms, such as succinic acid, adipic acid, suberic acid, azelaic acid, sebacic acid, undecanedioic acid and dodecanedioic acid.

Diacids of the cycloaliphatic or aromatic type may also be used. They are used in excess amounts in the proportion required for obtaining a polyamide having the desired average molecular weight, in accordance with conventional calculations such as currently used in the field of polycondensation reactions. The average molecular weight of the dicarboxylic polyamides is comprised between 300 and 15000, and preferably between 800 and 5000.

The polyethers having hydroxyl chain ends are linear or branched polyoxyalkylene gylcols such as polyoxyethylene glycol, polyoxypropylene glycol, polyoxytetramethylene glycol or mixtures thereof, or a copolyether derived from the above mentioned compounds, the average molecular weight of said polyethers being comprised between 200 and 6000, preferably between 400 and 3000.

The proportion by weight of polyoxyalkylene glycol with respect to the total weight of the constituents may vary from 5 to 85% and is preferably comprised between 10 and 50%. The polycondensation reaction for preparing a polyether-ester-amide is carried out in the presence of the catalyst under stirring and under a high vacuum on the order of 0.05 to 5 mm Hg at temperatures above the melting points of the constituents used, said temperatures being selected so that the reacting constituents are maintained in the fluid state; these temperatures are comprised between 100° and 400° C., and preferably between 200° and 300° C.

The reaction time may vary from 10 minutes to 10 hours, and is preferably comprised between 1 hour and 7 hours.

The reaction time depends on the nature of the polyoxyalkylene glycol, and it must be sufficiently long to allow the final viscosity to be obtained which is required for the obtention of products having satisfactory properties such as required for mouldable and/or extrudable plastic materials.

It should be noted, however, that preferably an equimolar ratio should exist between the carboxylic groups and the hydroxyl groups, so that the polycondensation reaction takes place under optimum conditions with a view to obtaining the desired product.

Additives such as anti-oxidants, stabilizing agents against the effects of light and heat, fire-proofing agents and pigments may be added to the polycondensate prior to the transformation operations or, when possible, during the polycondensation reaction, with a view to improving the properties of the final product or to modifying its properties, depending on the particular application envisaged.

The testing and identification values of the products obtained are as follows:

The Vicat point in °C. is determined in accordance with ASTM standard D 1525 65T.

The intrinsec viscosity is measured in metacresol at 25° C. (initial concentration: 0.8 g per 100 ml).

Elongation under tension is measured in accordance with ASTM standard D 638 67T, and the torsional modulus is measured in accordance with ASTM standard D 1043 61T (according to the CLASH and BERG method).

The invention will be described hereinafter by means of several examples which are given by way of illustration but not of limitation.

EXAMPLE 1

310 grs. 11-dicarboxylic polyamide having an average molecular weight of 2000, which had previously been prepared by polycondensation of 11-aminoundecanoic acid in the presence of adipic acid was introduced into a reactor having a capacity of 1 liter. 146 grs. polyoxyethylene glycol having a average molecular weight of 1000 and 1.5 grs. tetrabutylorthotitanate was then added. The reactive mixture was placed under an inert atmosphere and heated to a temperature of 260° C.; a vacuum was then produced in the reactor, while the mixture was vigorously stirred from the moment at which the constituents melted. The reaction was carried on during 7 hours at 260° C. under a vacuum of 0.1 mm Hg, and the stirring velocity had to be reduced as the viscosity increased.

The product obtained had an intrinsic viscosity of $\eta = 1.2$; differential thermal analysis and thermomechanical analysis showed that the melting point of the product was 173° C.; it presents a first glass transition point at $-58°$ C., and another one at $-18°$ C.

A portion of the product was finely ground to produce a powder having a particle size lower than 0.1 mm; 20 grs. of this powder was extracted with benzene during 24 hours in a Kumagawa extractor. 0.38 grs. polyoxyalkylene glycol which had not reacted was thus recovered, which corresponded to a consumption of at least 95% of the total amount of polyethylene glycol initially used.

The product was then extruded by means of a BRABENDER extruder at 210° C. and at a speed of 30 rpm. At the outlet of the extruder the product was obtained in the form of a string or rod which was cut into small cylinders which were melted by heating so as to allow them to be injection-moulded by means of an ARBURG injection moulding machine.

Test specimens having a thickness of 2 mm and a thinned section of a length of 50 mm were submitted to tension tests at a temperature of 20° C. at a speed of 14 mm per minute. According to ASTM standard D 638 67T tensional elongation was 14% under a stress of 97 kg/sq.cm at the yield point, and 560% under a stress of 280 kg/sq.cm at rupture.

The values of the torsional modulus G (according to the method of CLASH & BERG, ASTM specification No. D 1043 61T) were as follows for the various temperatures indicated:

| T °C. | $-40°$ C. | $-20°$ C. | 0° C. | 20° C. | 40° C. |
|---|---|---|---|---|---|
| G(kg/sq.cm): | 1040 | 740 | 560 | 510 | 500 |

The Vicat point was 151° C. under a load of 1 kg with a heating rate of 50° C. per hour.

EXAMPLE 2

For the purpose of comparison the same procedure as the one described in Example 1 was applied, but without using a catalyst, whereas all the other conditions were identical.

The product obtained had an intrinsic viscosity of 0.4 as measured in m-cresol at 25° C. Only 65% of the polyoxyethylene glycol was consumed in the reaction.

No technological quality control test could be carried out on this product, as the latter was too friable.

EXAMPLE 3

Using a mode of operation similar to the one described in Example 1 herein-above, 88.3 grs. 11-dicarboxylic polyamide (obtained by polycondensation of 11-amino-undecanoic acid in the presence of adipic acid) having an average molecular weight of 3200 was reacted with 11.7 grs. polyoxyethylene glycol having an average molecular weight of 425 in the presence of 0.28 gr. tetrabutylorthotitanate during 5 hours at 280° C. under high vacuum.

A block polycondensate was obtained which contained 11.7% (by weight) recurrent polyoxyethylene glycol units in the combined state in the macromolecule. The entire amount of the polyoxyethylene glycol initially used was consumed during the polycondensation reaction and the product obtained contained no free polyoxyethylene glycol.

The product obtained had an intrinsic viscosity of 0.80, a Vicat point of 163° C. (at 0° C. under a load of 1 kg) and a melting point of 180° C.

Elongation under tension was 14% under a stress of 183 kg/cm² at the yield point, and 375% under a stress of 367 kg/cm² at rupture. The values of the torsional modulus G measured in accordance with the method of CLASH and BERG were as follows for the temperatures indicated:

| T °C.: | −40° C. | −20° C. | 0° C. | 22° C. | 40° C. | 60° C. |
|---|---|---|---|---|---|---|
| G(kg/cm²): | 4127 | 2510 | 1222 | 755 | 614 | 437 |

EXAMPLE 4

Using the mode of operation described in Example 1, herein-above, 25.1 grs. 11-dicarboxylic polyamide (obtained by polycondensation of 11-amino-undecanoic acid in the presence of adipic acid) having an average molecular weight of 810 was reacted with 74.9 grs. polyoxyethylene glycol having an average molecular weight of 2400 in the presence of 0.46 gr tetrabutylorthotitanate.

The reaction was carried out at 280° C. under high vacuum during 4 hours.

The melting point of the obtained polymer was 140° C.

Its intrinsic viscosity was 1.15 and the block polycondensate contained 75.1% by weight polyethylene glycol in the combined state.

EXAMPLE 5

The catalyst constituted by tetrabutylorthotitanate doped with sodium (catalyst a) was prepared in an anhydrous medium by dissolving 1 gr. sodium in 99 grs. n-butanol and then adding 14.8 grs. tetrabutylorthotitanate. The solution was then diluted with n-butanol to a total volume of 200 ml.

Using the mode of operation described in Example 1, 54 grs. 11-dicarboxylic polyamide having an average molecular weight of 1135 was reacted with 46 grs. polyoxyethylene glycol having an average molecular weight of 970 in the presence of 1.46 grs. tetrabutylorthotitanate doped with sodium (catalyst a) during 4 hours at 280° C. under high vacuum. The product obtained had an intrinsic viscosity of 1.68 and contained 47.9% (by weight) polyoxyethylene glycol in the combined state in the polycondensate, the melting point of which was 150° C. The Vicat point was 125° C. under a load of 1 kg.

Elongation under tension was 15% under a stress of 68 kg/cm² at the yield point, and 310% under a stress of 165 kg/cm² at rupture. The values of the torsional modulus G determined according to the method of CLASH & BERG were as follows for the temperatures indicated:

| T °C.: | −40° C. | −20° C. | 0° C. | 22° C. | 60° C. |
|---|---|---|---|---|---|
| G(kg/cm²): | 464 | 314 | 240 | 273 | 160 |

EXAMPLE 6

The catalyst constituted by tetrabutyl-orthotitanate doped with magnesium (catalyst b) was prepared in an anhydrous medium by dissolving 1.41 gr. magnesium turnings in 300 ml of anhydrous n-butanol. The solution was heated under reflux during 4 hours, and 36 grs. tetrabutyl-orthotitanate was then added, followed by heating under reflux during 1 hour. The resulting mixture was then cooled and protected against humidity.

In accordance with the mode of operation described in Example 1 herein-above, 77.4 grs. 11-dicarboxylic polyamide having an average molecular weight of 3420 was reacted with 22.6 grs. of a polyoxypropylene having an average molecular weight of 1000, in the presence of 0.67 gr. tetrabutylorthotitanate doped with magnesium, during 4 hours at 280° C. under high vacuum.

The product obtained had an intrinsic viscosity of 1.5 and contained 25.5% by weight polyoxypropylene glycol in the combined state in the polycondenstate the melting point of which was 175° C. The Vicat point was 163° C.

Elongation under tension was 14% under a stress of 162 kg/cm² at the yield point, and 310% under a stress of 324 kg/cm² at rupture.

The values of the torsional modulus G measured according to the method of CLASH & BERG were as follows for the temperatures indicated:

| T °C.: | −40° C. | −20° C. | 0° C. | 22° C. | 40° C. | 60° C. |
|---|---|---|---|---|---|---|
| G(kg/cm²): | 2579 | 1547 | 884 | 554 | 408 | 302 |

EXAMPLE 7

Using the same mode of operation as in Example 1 herein-above, 50.7 grs. 11-dicarboxylic polyamide having an average molecular weight of 1035 was reacted with 49.3 grs. polyoxylene glycol having an average molecular weight of 1000 in the presence of 1.51 gr catalyst a (tetrabutylorthotitanate doped with sodium) during 6 hours at 280° C. under high vacuum.

The product obtained contained 55.4% by weight polyoxylene glycol at the combined state in the polycondensate and had the following properties:
melting point: 157° C.
intrinsic viscosity: 0.90
Vicat point (°C. under a load of 1 kg): 98

Elongation under tension was 18%, under a stress of 54 kg/cm² at the yield point, and 60% under a stress of 64 kg/cm² at rupture.

The values of the torsional modulus G measured according to the method of CLASH & BERG were as follows for the temperatures indicated:

| T °C.: | −40° C. | −20° C. | 0° C. | 22° C. | 60° C. |
|---|---|---|---|---|---|
| G(kg/cm²): | 295 | 151 | 147 | 180 | 120 |

EXAMPLE 8

In accordance with the mode of operation described in Example 1 hereinabove, 75.6 grs. 11-dicarboxylic polyamide having an average molecular weight of 3100 was reacted with 24.4 grs. polyoxytetramethylene glycol having an average molecular weight of 1000, in the presence of 0.73 gr. catalyst a (tetrabutyl-orthotitanate doped with sodium) during 4 hours at 280° C.

The polycondensate obtained contained 25.2% (by weight) polyoxytetramethylene glycol in the combined state.

The properties were as follows:
melting point: 180° C.
intrinsic viscosity: 1.10
Vicat point (°C. under a load of 1 kg): 163° C.
Elongation under tension was 18% under a stress of 137 kg/cm$^2$ at the yield point, and 327% under a stress of 227 kg/cm$^2$ at rupture.

The values of the torsional modulus G (CLASH & BERG) were as follows for the temperatures indicated:

| T °C.: | −40° C. | −20° C. | 0° C. | 22° C. | 60° C. |
|---|---|---|---|---|---|
| G(kg/cm$^2$): | 2650 | 1600 | 1000 | 825 | 400 |

EXAMPLE 9

In accordance with the mode of operation described in Example 1, herein-above, 51.7 grs. 11-dicarboxylic polyamide having an average molecular weight of 1000 was reacted with 48.3 grs. polyoxytetramethylene glycol having an average molecular weight of 1000 in the presence of 1.45 gr. catalyst a (tetrabutyl-orthotitanate doped with sodium) during 6 hours at 280° C. under high vacuum. The block copolymer obtained contained 52.9% by weight polyoxytetramethylene glycol in the combined state.

The properties were as follows:
melting point: 165° C.
intrinsic viscosity: 1.44
Vicat point (°C. under a load of 1 kg): 115° C.
elongation under tension was 18% under a stress of 54 kg/cm$^2$ at the yield point, and 647% under a stress of 118 kg/cm$^2$ at rupture.

The values of the torsional modulus G (CLASH & BERG) were as follows for the temperatures indicated:

| T °C.: | −40° C. | −20° C. | 0° C. | 22° C. | 40° C. | 60° C. |
|---|---|---|---|---|---|---|
| G(kg/cm$^2$): | 773 | 364 | 299 | 238 | 182 | 131 |

EXAMPLE 10

25 grs. 12-aminododecanoic acid were introduced into a reactor comprising an agitator and means for connecting the reactor to a vacuum source. The acid was heated during 3 hours at a temperature comprised between 220° and 240° C. under reduced pressure, and the polycondensation was limited by adding 4 grs. adipic acid. A dicarboxylic polyamide having an average molecular weight of 1084 was thus obtained; the same carboxylic dipolyamide may also be obtained by hydrolytic polymerisation of lactam 12 under pressure at a temperature of 300° C. in the presence of adipic acid.

27.9 grs. polytetramethylene glycol having an average molecular weight of 1000 was added to 24.7 grs. of the above-mention dicarboxylic dipolyamide in the presence of 0.68 gr. tetrabutyl-orthotitanate.

The reactive mixture was heated in an inert atmosphere until a temperature of 280° C. was reached.

The mixture was then placed under high vacuum (0.1 mm Hg) and the reaction was continued during 3 hours under stirring.

The obtained product had an intrinsic viscosity of 1.3 and contained 48.16% (by weight) polyoxytetramethylene glycol in the combined state in the polycondensate.

EXAMPLE 11

Using the mode of operation similar to the one described in Example 1, herein-above, 68 grs. 11-dicarboxylic polyamide (obtained by polycondensation of 11-amino-undecanoic acid in the presence of adipic acid) having an average molecular weight of 2000 was reacted with 32 grs. polyoxyethylene gycol having an average molecular weight of 1000 in the presence of 0.33 gr. tetra-isopropyl-orthotitanate during 7 hours at 260° C. under high vacuum.

A block polycondensate was obtained which has an intrinsic viscosity of 1.2 and contained 33% (by weight) recurrent polyethylene glycol units in the combined state in the molecule, while the melting point of the product obtained was 173° C.

EXAMPLE 12

310 grs. of the dicarboxylic polyamide used in Example 11 and 152 grs. copolyethylene glycol-polypropylene glycol (50/50) having an average molecular weight of 1000 were introduced together with 1.3 gr. tetraisopropyl-orthotitanate into a reactor having a capacity of 1 l.

The reaction was carried out under the same conditions as those described in Example 1. The obtained product had an intrinsic viscosity of 1.4, and the yield was 96% with respect to the consumption of copolyoxyalkylene glycol.

EXAMPLE 13

48.3 grs. dihexylammonium azelaate salt (F=151°–152° C.) and 3.35 grs. adipic acid were introduced into a reactor comprising an agitator and means for connection with a vacuum source. The reactive mixture was heated to a temperature of 180° C. during 3 hours and to a temperature comprised between 180° C. and 250° C. during 2 hours. A 6.9 dicarboxylic polyamide having an average molecular weight of 1886 was obtained.

17.6 grs. polyoxytetramethylene glycol having an average molecular weight of 1000 was added to 32 grs. of this dicarboxylic polyamide in the presence of 0.51 gr. tetrabutyl-orthotitanate. The reactive mixture was placed in an inert atmosphere and heated until a temperature of 280° C. was reached; the mixture was then placed under high vacuum (0.1 mm Hg), and the reaction was continued during 2 hours under stirring.

The product obtained had an intrinsic viscosity of 2.05 and contained 36.5% by weight polyoxytetramethylene glycol in the combined state in the polycondensate. Its melting point was 148° C.

EXAMPLE 14

273 grs. dihexylammonium sebacate salt (F=172°–173° C.) and 19.06 grs. adipic acid was introduced into a reactor comprising an agitator and means for connection to a vacuum source; the mixture was heated to a temperature comprised between 200° and 220° C. during 4 hours. A 6.10-dicarboxylic polyamide having an average molecular weight of 1332 was thus obtained. 230 grs. polyoxytetramethylene glycol having an average molecular weight of 1000 was added to 306 grs. of this dicarboxylic polyamide in the presence of 1.5 gr. tetrabutyl-orthotitanate.

The reactive mixture was placed under an inert atmosphere and heated until a temperature of 280° C. was reached; the mixture was then placed under high vacuum (0.1 mm Hg) and the reaction was continued under stirring during 3 hours.

The product obtained had an intrinsic viscosity of 1.40 and contained 46.93% by weight tetra-oxymethylene glycol in the combined state in the polycondensate.

Its melting point was 170° C.

EXAMPLE 15

100 grs. hexyldiammonium dodecanoic salt (F=160° C.) and 7.1 grs. adipic acid were introduced into a reactor provided with an agitator and with means for connection to a vacuum source, and the mixture was heated during 3 hours to 170° C., and then heated during 2 hours to a temperature comprised between 180° C. and 250° C.

A 6.12-dicarboxylic polyamide having an average molecular weight of 1998 was thus obtained. 15.5 grs. polytetramethylene glycol having an average molecular weight of 1000 was added to 131 grs. of this dicarboxylic polyamide in the presence of 0.52 gr. tetrabutyl-orthotitanate. The reactive mixture was placed in an inert atmosphere and heated until a temperature of 280° C. was reached; the mixture was then placed under high vacuum (0.1 mm Hg) and the reaction was continued during 3 hours under stirring.

The product thus obtained had an intrinsic viscosity of 1.56 and contained 32.2% (by weight) polyoxytetramethylene glycol in the combined state in the polycondensate.

Its melting point was 159° C.

EXAMPLE 16

865 grs. 6-dicarboxylic polyamide having an average molecular weight of 1400 and still containing 3.6% (by weight) caprolactam, and 400 grs. polytetramethylene glycol having an average molecular weight of 650 were introduced together with 6.4 grs. tetrabutyl-orthotitanate into a reactor provided with agitating means and with means for connection with a vacuum source. A partial vacuum was established with a view to eliminating the gases from the reactive medium. The reactive mixture was heated to 240° C. during one hour. When this temperature was reached, a vacuum of 1 mm Hg was established and the polycondensation reaction was continued for 2 hours, during which period of time the temperature increased so as to reach 255° C. The reaction was then discontinued. The weight of the lactam recovered under vacuum during the reaction was 29 grs. The product obtained contained 5.3% substances having a low molecular weight which were extracted with benzene, and it had the following properties:
intrinsic viscosity: 1.45
Vicat point: 162° C. under a load of 1 kg
Elongation under tension was 12.5% under a stress of 103 kg/sq.cm at the yield point, and 490% under a stress of 425 kg/sq.cm at rupture.

The values of the torsional modulus G were as follows for the temperatures indicated (as determined according the method of CLASH and BERG):

| T °C.: | −40 | −20 | 0 | 20 | 60 |
|---|---|---|---|---|---|
| G(kg/sq.cm): | 3400 | 1900 | 1200 | 860 | 530 |

EXAMPLE 17

Using an operating mode similar to that described in Example 1 hereinabove, 560 grs. 12-dicarboxylic polyamide (obtained by the polycondensation of lactam 12 in the presence of adipic acid) having an average molecular weight of 5600 was reacted with 102 grs. polyoxypropylene glycol having an average molecular weight of 1020 in the presence of 4 grs. tetra-orthobutyltitanate during 6 hours at 250° C. under a vacuum of 0.3 mm Hg in a reactor. A block polycondensate was obtained which contained 15.4% (by weight) recurrent polyoxypropylene glycol units in the combined state in the macromolecule. The entire amount of the polyoxypropylene glycol initially used had been consumed during the polycondensation reaction. The product obtained had the following properties:
intrinsic viscosity: 1.4
Vicat point: 157° C. (under a load of 1 kg)
Softening point: 175° C.
Elongation under tension was 365% under a stress of 375 kg/sq.cm at rupture The values of the torsional modulus G according to the method of CLASH and BERG were as follows, for the temperatures indicated:

| T °C.: | −40 | −20 | 0 | 22 | 40 | 60 |
|---|---|---|---|---|---|---|
| G(kg/sq.cm): | 4600 | 3300 | 2400 | 1700 | 860 | 620 |

It is to be understood that the invention is not limited to the specific examples described hereinabove which are given only by way of illustration, and that modifications may be made within the scope of the appended claims without departing from the spirit of the invention.

What is claimed is:

1. A moldable and extrudable polyether-ester-amide block copolymer having the formula:

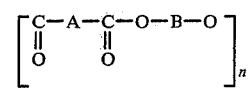

wherein A is a linear saturated aliphatic polyamide sequence formed from a lactam or amino acid having a hydrocarbon chain containing 4 to 14 carbon atoms or from an aliphatic $C_6$-$C_{12}$ dicarboxylic acid and a $C_6$-$C_9$ diamine, in the presence of chain-limiting aliphatic carboxylic diacid having 4 to 20 carbon atoms; said polyamide sequence having an average molecular weight of between about 300 and about 15000; and B is a polyether sequence formed from linear or branched aliphatic polyoxyalkylene glycols or mixtures thereof, said polyoxyalkylene glycol having an average molecular weight of from about 200 to about 6000; wherein the proportion by weight of polyoxyalkylene glycol with respect to the total weight of polyether-ester-amide is from about 5 to about 85%; and n indicates a sufficient number of repeating units so that said polyether-ester-amide has an intrinsic viscosity of from 0.8 to 2.05.

2. The moldable and extrudable polyether-ester-amide block copolymer as defined in claim 1 which exhibits a melting point in the range of from about 140° to about 180° C., a Vicat point in the range of from about 98° to about 157° C. and an elongation under tension at yield point in the range of from about 12.5% to about 18%.

3. The moldable and extrudable polyether-ester-amide copolymer as defined in claim 2 which exhibits a torsional modulus at 0° C. in the range of from about 147 to about 2400 kg/cm$^2$.

4. The polyether-ester-amide copolymer of claim 1 wherein the lactam or amino acid having a hydrocarbon chain of 4 to 14 carbon atoms is selected from the group consisting of caprolactam, oenantholactam, dodecalactam, undecanolactam, dodecanolactam, 11-aminoundecanoic acid, and 12-aminododecanoic acid.

5. The polyether-ester-amide copolymer of claim 1 wherein the polyamide is formed from a dicarboxylic acid and a diamine wherein the diamine is hexamethylene diamine or nonamethylene diamine and the acid is adipic acid, azelaic acid, sebacic acid, or 1,12-dodecanedioic acid.

6. The polyether-ester-amide copolymer of claim 1 wherein the chain-limiting carboxylic aliphatic diacid is acid selected from the group consisting of succinic acid, adipic acid, suberic acid, azelaic acid, sebacic acid, undecanedioic acid and dodecanedioic acid.

7. The polyether-ester-amide copolymer of claim 1 wherein the polyoxyalkylene glycol is selected from the group consisting of polyoxyethylene glycol, polyoxypropylene glycol, polyoxytetramethylene glycol, mixtures thereof and a copolyether derived therefrom.

8. The polyether-ester-amide copolymer of claim 1 wherein the proportion by weight of polyoxyalkylene glycol is from about 5 to about 50%.

9. The polyether-ester-amide copolymer of claim 8 wherein the proportion by weight of polyoxyalkylene glycol is from about 10 to about 50%.

10. The polyether-ester-amide copolymer of claim 1 wherein the polyoxyalkylene glycol has an average molecular weight of from about 200 to about 3000.

11. The polyether-ester-amide copolymer of claim 10 wherein the polyoxyalkylene glycol has an average molecular weight of from about 400 to about 3000.

12. The polyether-ester-amide copolymer of claim 10 wherein the polyoxyalkylene glycol has an average molecular weight of from about 200 to about 400.

13. The polyether-ester-amide copolymer of claim 1 wherein the polyamide sequence is formed from a 11-dicarboxylic polyamide prepared by the polycondensation of 11-aminoundecanoic acid and adipic acid and the polyoxyalkylene glycol is polyoxyethylene glycol.

14. The polyether-ester-amide copolymer of claim 13 wherein the average molecular weight of the polyamide sequence is about 2000 and the average molecular weight of the polyoxyalkylene glycol is about 1000 and which exhibits an intrinsic viscosity of about 1.2, a Vicat point of about 151° C., an elongation under tension at yield point of about 14% and a torsional modulus at 0° C. of about 560 kg/cm$^2$.

15. The polyether-ester-amide copolymer of claim 13 wherein the average molecular weight of the polyamide sequence is about 3200 and the average molecular weight of the polyoxyalkylene glycol is about 425 and which exhibits an intrinsic viscosity of about 0.8, a Vicat point of about 163° C., an elongation under tension at yield point of about 14% and a torsional modulus at 0° C. of about 1222 kg/cm$^2$.

16. The polyether-ester-amide copolymer of claim 13 wherein the average molecular weight of the polyamide sequence is about 810 and the average molecular weight of the polyoxyalkylene glycol is about 2400 and which exhibits an intrinsic viscosity of about 1.15 and a melting point of about 140° C.

17. The polyether-ester-amide copolymer of claim 13 wherein the average molecular weight of the polyamide sequence is about 1135 and the average molecular weight of the polyether sequence is about 970 and which exhibits an intrinsic viscosity of about 1.68, a Vicat point of about 125° C., an elongation under tension at yield point of about 15% and a torsional modulus at 0° C. of about 240 kg/cm$^2$.

18. The polyether-ester-amide copolymer of claim 13 wherein the average molecular weight of the polyamide sequence is about 1035 and the average molecular weight of the polyether sequence is about 1000 and which exhibits an intrinsic viscosity of about 0.9, a Vicat point of about 98° C., an elongation under tension at yield point of about 18% and a torsional modulus at 0° C. of about 147 kg/cm$^2$.

19. The polyether-ester-amide of claim 1 wherein the polyamide sequence is formed by a 11-dicarboxylic polyamide obtained by the condensation of 11-aminoundecanoid acid in the presence of adipic acid and the polyoxyalkylene glycol is copolyoxyethylene polyoxypropylene glycol or polyoxypropylene glycol.

20. The polyether-ester-amide copolymer of claim 19 wherein the average molecular weight of the polyamide sequence is about 3420 and the polyether sequence is polyoxypropylene having an average molecular weight of about 1000 and which exhibits an intrinsic viscosity of about 1.5, a Vicat point of about 163° C., an elongation under tension at yield point of about 14% and a torsional modulus at 0° C. of about 884 kg/cm$^2$.

21. The polyether-ester-amide copolymer of claim 19 wherein the average molecular weight of the polyamide sequence is about 2000 and the polyether sequence is copolyoxyethylene-polyoxypropylene glycol having an average molecular weight of about 1000 and which exhibits an intrinsic viscosity of about 1.4.

22. The polyether-ester-amide copolymer of claim 1 wherein the polyamide sequence is formed from a 11-dicarboxylic polyamide prepared by the polycondensation of 11-amino decanoic acid in the presence of adipic acid and the polyoxyalkylene glycol is polyoxytetramethylene glycol.

23. The polyether-ester-amide copolymer of claim 22 wherein the average molecular weight of the polyamide sequence is about 3100 and the average molecular weight of the polyether sequence is about 1000 and which exhibits an intrinsic viscosity of about 1.10, a Vicat point of about 163° C., an elongation under tension at yield point of about 18% and a torsional modulus at 0° C. of about 1000 kg/cm$^2$.

24. The polyether-ester-amide copolymer of claim 22 wherein the average molecular weight of the polyamide sequence is about 1000 and the average molecular weight of the polyether sequence is about 1000 and which exhibits an intrinsic viscosity of about 1.44, a Vicat point of about 115° C., an elongation under tension at yield point of about 18% and a torsional modulus at 0° C. of about 299 kg/cm$^2$.

25. The polyether-ester-amide copolymer of claim 1 wherein the polyamide sequence has an average molecular weight of about 1084 and is a 12-dicarboxylic acid polyamide formed by condensation of 12-aminododecanoic acid in the presence of adipic acid and the polyoxyalkylene sequence has an average molecular weight of about 1000 and is formed from polyoxytetramethylene glycol and which exhibits an intrinsic viscosity of about 1.3.

26. The polyether-ester-amide copolymer of claim 1 wherein the polyamide sequence has an average molecular weight of about 1886 and is 6.9-dicarboxylic acid polyamide formed by condensation of dihexylammonium azelaate in the presence of adipic acid and the polyoxyalkylene sequence has an average molecular weight of about 1000 and is formed from polyoxytetramethylene glycol and which exhibits an intrinsic viscosity of about 2.05 and a melting point of about 148° C.

27. The polyether-ester-amide copolymer of claim 1 wherein the polyamide sequence has an average molecular weight of about 1332 and is a 6,10-dicarboxylic acid polyamide formed by condensation of dihexylammonium sebacate in the presence of adipic acid and the polyoxyalkylene sequence has an average molecular weight of about 1000 and is formed from polyoxytetramethylene glycol and which exhibits an intrinsic viscosity of about 1.40.

28. The polyether-ester-amide copolymer of claim 1 wherein the polyamide sequence has an average molecular weight of about 1998 and is a 6.12-dicarboxylic acid polyamide formed by condensation of hexyldiammonium dodecanoic salt in the presence of adipic acid and the polyoxyalkylene sequence has an average molecular weight of about 1000 and is formed from polyoxytetramethylene glycol and which exhibits an intrinsic viscosity of about 1.56.

29. The polyether-ester-amide copolymer of claim 1 wherein the polyamide sequence has an average molecular weight of about 1400 and is a 6-dicarboxylic acid polyamide formed by condensation of caprolactam and the polyoxyalkylene sequence has an average molecular weight of about 650 and is formed from polyoxytetramethylene glycol and which exhibits an intrinsic viscosity of about 1.45, a Vicat point of about 162° C., an elongation under tension at yield point of about 12.5% and a torsional modulus at 0° C. of about 1200 kg/cm$^2$.

30. The polyether-ester-amide copolymer of claim 1 wherein the polyamide sequence has an average molecular weight of about 5600 and is a 12-dicarboxylic acid polyamide formed by condensation of 12-lactam in the presence of adipic acid and the polyoxyalkylene sequence has an average molecular weight of about 1020 and is formed from polyoxypropylene glycol and which exhibits an intrinsic viscosity of about 1.4, a Vicat point of about 157° C., and a torsional modulus at 0° C. of about 2400 kg/cm$^2$.

31. A fiber product consisting essentially of the polyether-ester-amide copolymer of claim 1.

32. A fiber product consisting essentially of the polyether-ester-amide copolymer of claim 12.

33. The moldable and extrudable polyether-ester-amide block copolymer of claim 1 formed in the presence of a titanate-like catalyst.

34. The moldable and extrudable polyether-ester-amide block copolymer of claim 1 formed in the presence of a tetra-alkylortho-titanate catalyst.

* * * * *